Inventor
MAGNUS H. JOHANSON
By
Attorney

April 10, 1945. M. H. JOHANSON 2,373,187
DRESSING MECHANISM
Filed Nov. 4, 1943 4 Sheets-Sheet 3
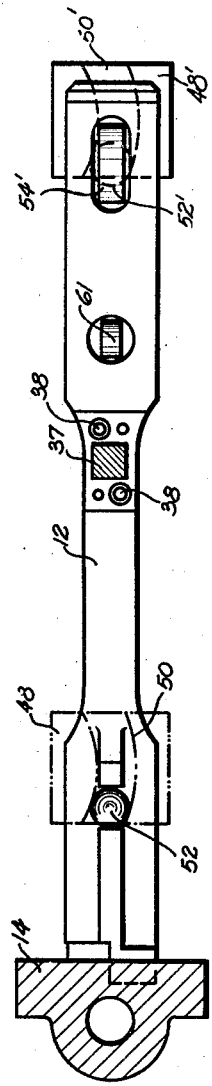
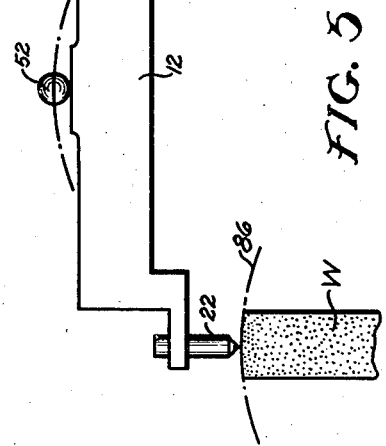
Inventor
MAGNUS H. JOHANSON
By
Attorney

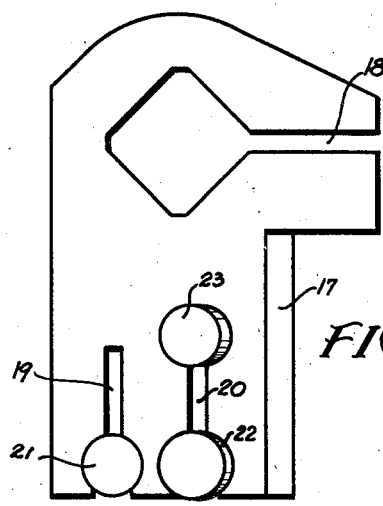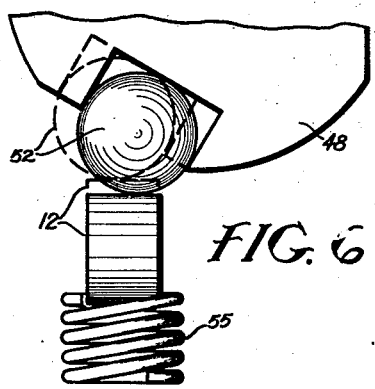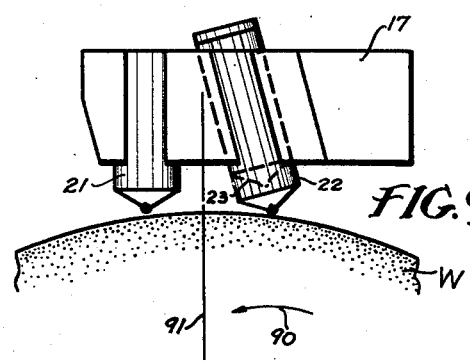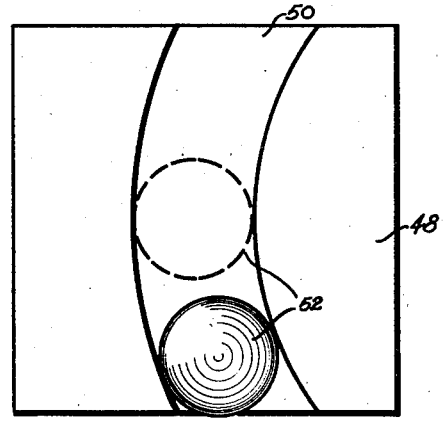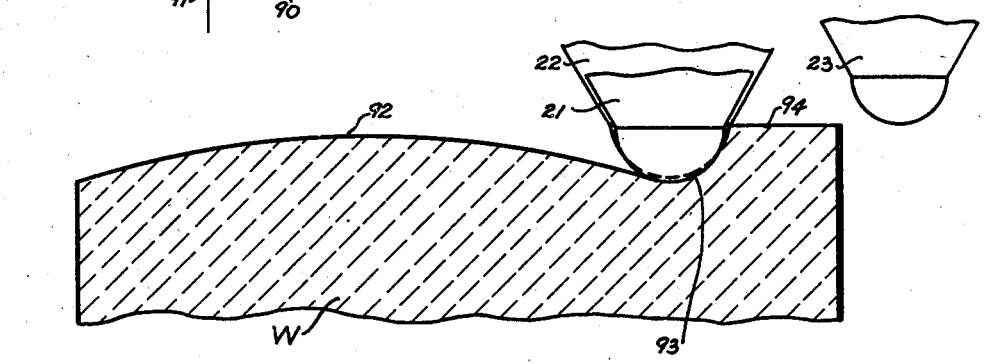

UNITED STATES PATENT OFFICE 2,373,187

DRESSING MECHANISM

Magnus H. Johanson, Rochester, N. Y., assignor to Gleason Works, Rochester, N. Y., a corporation of New York Application November 4, 1943, Serial No. 508,938

8 Claims. (Cl. 125—11)

The present invention relates to dressing mechanisms and particularly to apparatus for dressing the grinding wheels of face-mill gear cutter relieving grinders.

Until very recently, all face-mill gear cutter blades in general use had straight-sided cutting edges and these blades were relief-ground by grinding wheels of substantially straight profile shape. As further refinements have been made in the manufacture of spiral bevel and hypoid gears, it has become more and more the practice to use face-mill gear cutter blades of spherical form, or more broadly, face-mill gear cutter blades having the side-cutting edges of curved profile shape. The outside blades of the cutters are made with side-cutting edges of convex profile shape and the inside-cutting blades of the cutters are made with side-cutting edges of concave profile shape.

To relief-grind face-mill gear cutter blades of curved profile shape, it is desirable to use a grinding wheel having a profile shape substantially complementary to the profile shape of the blades to be ground. In order to dress a grinding wheel to a curved profile shape, a curved guide or template has heretofore been required, and for each different profile shape desired, a different guide or template has been required. Moreover, since a great number of straight-sided blades are still made, it has heretofore been necessary to change guides or forms back and forth, when using the same machine to relieve both straight-sided and curve-sided cutter blades, so that the grinding wheel might be dressed to the shape required for a particular job.

In the relieving of face-mill gear cutter blades, the customary practice is to relief grind both sides and the tip of each blade and the rounds joining the two sides with the tip. Heretofore, separate operations have been required for relief-grinding these different parts of the blades, and heretofore no suitable method has been available for grinding the rounds on the blades except a plunge-cut method in which a grinding wheel is engaged with the blade and the sharp corner at the juncture of the side and tip of the blade is allowed to wear a groove into the wheel which in turn grinds a round on the blade. This method is, of course, not scientific and not too accurate because different wheels break down at different rates.

One object of the present invention is to provide a simple, easily constructed, and inexpensive apparatus for dressing a curved profile on a grinding wheel.

Another object of the invention is to provide an apparatus for dressing either a straight or a curved profile shape on a grinding wheel and, in the case of a curved profile shape, either a convex or a concave shape.

Another object of the invention is to provide a dressing mechanism which may be readily adjusted to dress circular arcuate profiles of different radii of curvature on a grinding wheel.

A further object of the invention is to provide a dressing mechanism for dressing a grinding wheel so that it may be used to grind simultaneously a side and the round joining that side with the tip of the wheel.

Still a further object of the invention is to provide a dressing mechanism for dressing in a single operation a grinding wheel to a shape to grind a side of a cutter blade and the round at the juncture of that side with the tip of the blade.

Other objects of this invention will be apparent hereinafter from the specification and from the recital of the appended claims.

In the drawings:

Fig. 4 is a top plan view of the diamond-carrying ram, some of the parts being shown in section;

Fig. 5 is a diagrammatic view illustrating the operation of the dressing mechanism;

Fig. 6 is a fragmentary view further illustrating diagrammatically the operation of the dressing mechanism;

Fig. 7 is a plan view of one of the control cams showing in full lines and in dotted lines, respectively, two positions of the ball follower during travel of the follower from one end of the cam slot to the other;

Fig. 8 is a top plan view and Fig. 9 an end elevation of the diamond-holder, the latter view illustrating, also, how the round-dressing diamond clears the grinding wheel during the dressing of the profile shape on the wheel; and Fig. 10 is a more or less diagrammatic view showing the position of the dressing diamonds at the moment of dressing the round on the grinding wheel.

Figure 1:
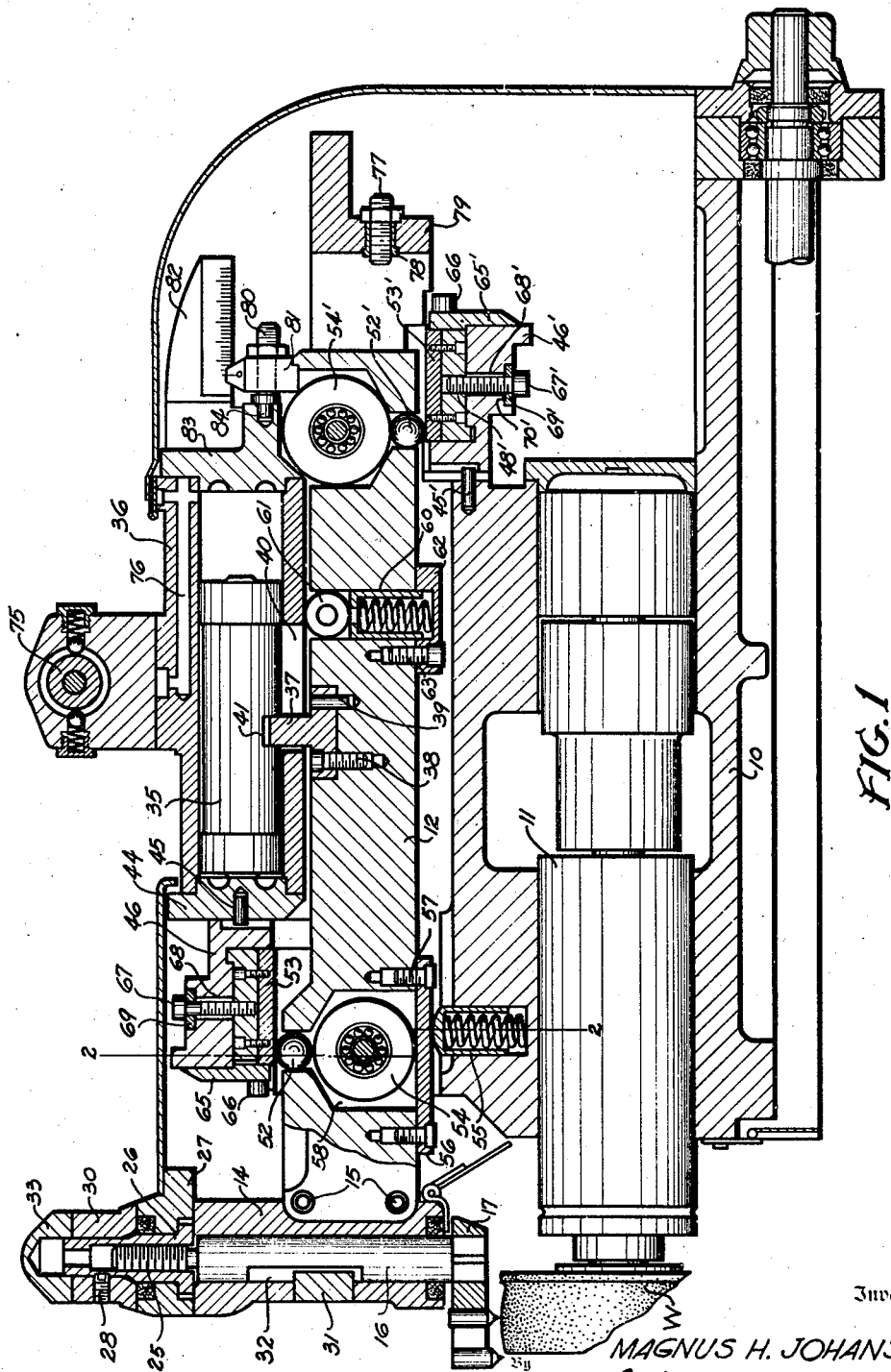
Fig. 1 is a vertical sectional view, showing a dressing mechanism built according to one embodiment of this invention mounted on the wheel head of a face-mill gear cutter relieving grinder of standard construction.

In the embodiment of the invention illustrated in the drawings, there are three dressing tools provided. One of these is for dressing the active profile of the grinding wheel, one is for dressing a round on the wheel at the top of the profile, and the third is for dressing the inactive portion of the profile of the wheel which extends for the remainder of the height of the wheel. The three dressing tools are carried by a single ram which is held against lateral movement and which is reciprocable rectilinearly and which is moveable transversely up and down with reference to the path of its reciprocatory movement. The rectilinear reciprocatory movement serves to carry the diamond back and forth along the height of the wheel profile while the transverse movement serves to control the shape of the active portion of the wheel profile.

The transverse movement is controlled by two identical cams, each having a longitudinally-curved slot. Each cam is mounted in a block which is adjustable angularly about an axis extending in the direction of reciprocation of the ram. The ram carries two balls, one of which engages in each of the cam slots. Each ball rolls along the bottom of its cam slot from one end thereof to the other as the ram reciprocates. Coil springs, which act on the ram, serve to keep the balls in engagement with the bottoms of their respective cam slots and cause the ram to move transversely as the balls move transversely. When the cams are in the zero positions of their adjustment, the plane bottom of each cam slot is parallel to the direction of rectilinear movement of the ram and no transverse movement of the ram takes place. Hence, the dressing tool will dress a straight profile on the grinding wheel. When the cams are tilted, however, in any position of their angular adjustment, the plane bottom surfaces of the cam slots are inclined to the mean plane of rectilinear movement of the ram. Hence as the balls move laterally along the curves of the cams, they will also move transversely to the rectilinear path of the ram movement and the ram will move transversely with them. Thus, by varying the angular positions of the cams, the radius of curvature of the active profile dressed on the grinding wheel can be controlled.

As stated, there are three diamonds carried by the ram. One of these dresses the active profile shape of the grinding wheel. Another is shaped to dress a round on the wheel and is operative only at the end of the return stroke of the ram. The third operates during the ram stroke but is set higher than the diamond, which dresses the active profile, and this third diamond dresses the inactive portion of the wheel profile which must be of sufficient height to prevent breaking away of the wheel at and above the round.

Referring now to the drawings, 10 denotes one of the wheel heads of a standard face-mill gear cutter relieving grinder. 11 is the wheel spindle which is journaled in this head, and W the grinding wheel which is to be dressed. The wheel W is secured to the wheel spindle 11 in any usual or suitable manner.

Mounted in the wheel head to reciprocate therein is a ram 12. This ram is mounted above the wheel spindle 11 to move longitudinally in the direction of the axis of the wheel spindle. The ram reciprocates in a longitudinal guide slot formed in the wheel head 10, as clearly shown in Fig. 2. The ram carries at its forward end a barrel or support 14 which may be secured to the ram in any suitable manner as by means of the clamping bolts 15. Mounted in the support 14 is a bar 16 to the lower end of which is clamped the block 17 which carries the dressing tools. The bar 16 is diamond-shaped at its lower end and the block 17 is correspondingly shaped, as shown in Fig. 8, to fit over the lower end of the bar. The block is slotted as denoted at 18 in Fig. 8 and is held on the bar by a clamping bolt which operates the split-clamp so formed.

The block 17 is provided with two other clamping slots, 19 and 20. The clamping slot 19 is recessed to receive the diamond holder 21 which carries the diamond for dressing the round on the grinding wheel. The clamping slot 20 has two recesses to receive the diamond holders 22 and 23, respectively, which carry the diamonds for dressing the active and inactive portions of the wheel profile, respectively.

The bar 16 is adjustable longitudinally in the support 14 in a direction transverse to the direction of movement of the ram to permit adjusting the dressing diamonds into operative relation with the grinding wheel W to be dressed. For this purpose, the bar 16 is formed with a threaded extension 25 at its upper end which is of reduced diameter and which threads into a nut 26. The nut 26 is journaled in a block 27 that is fixedly secured to the support 14. The nut 26 is secured by a set-screw 28 to a dial 30 which is graduated to read against a zero mark on the block 27. The bar 16 is held against rotation by a key 31 which is secured in the support 14 and which engages in a longitudinal slot 32 formed in the bar. Thus, as the dial 30 is rotated, the bar 16 is adjusted to vary the distance of the dressing diamonds from the axis of the wheel spindle 11 in accordance with the diameter of the wheel to be dressed. A cap-member 33, which may be secured to the dial, serves to protect the adjusting parts from grit.

The ram 12 is reciprocated, to move the diamonds along the height of the grinding wheel, by a piston 35 which reciprocates in a cylinder 36 that is mounted on the wheel head 10. The piston is connected to the ram 12 by a lug or block 37. This lug or block 37 is fastened to the ram 12 by the screws 38 and dowel pins 39. It passes through a slot 40 in the side wall of the cylinder 36 and it engages in a recess 41 formed in the piston 35.

Secured to the wheel head 10, as by means of screws (not shown) and dowels 45, are two blocks or supports 46 and 46'. One of these is mounted above the ram 12 at the front end of the cylinder 36; the other is mounted below the ram 12 and rearwardly of the cylinder 36. The former is secured to the front end-plate 44 of the cylinder 36; the latter is secured directly to the wheel head.

Each block 46 is formed with an arcuate guide surface 47 (Fig. 2), and on the guide surfaces 47 there are mounted cam members 48 and 48' that have arcuate surfaces seating on the guide surfaces 47. The cam members 48 and 48' are formed with longitudinally circular arcuate slots 50 and 50', respectively, and these slots are parallel to one another.

Figure 2:
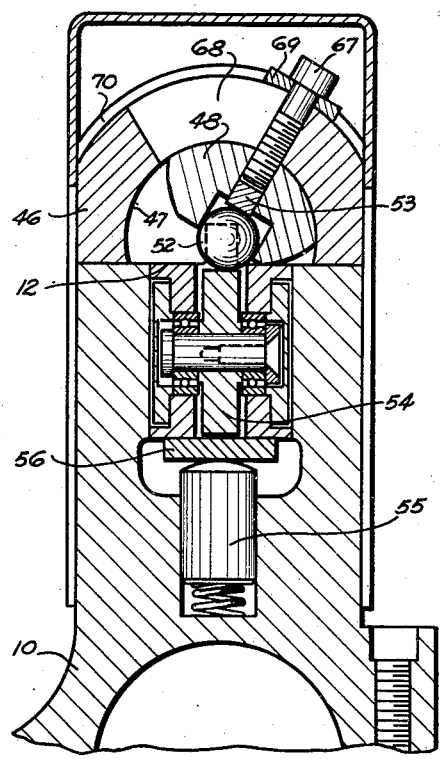
Fig. 2 is a fragmentary sectional view through the dressing mechanism and wheel head on an enlarged scale and taken on the line 2—2 of Fig. 1.

The ram 12 is formed, as clearly shown in Figs. 1 and 2, with two pockets that hold balls 52 and 52', respectively. The ball 52 engages in the slot 50 of the cam member 48 and the ball 52' engages in the slot 50' of the cam member 48'. Hardened blocks 53 and 53', respectively, are secured in the bottoms of the slots 50 and 50', respectively. These hardened blocks have plane surfaces on which the balls 52 and 52', respectively, ride.

To reduce the friction there are two identical rollers 54 and 54' journaled on anti-friction bearings in the ram 12. One of these rollers engages with the ball 52 and the other with the ball 52'.

The roller 52 is held in engagement with the hardened plate 53 by a spring-pressed plunger 55 which is mounted in a recess of the wheel head 10 and which engages with the plate 56 that is secured to the lower face of the ram 12 by screws 57. This plate 56 serves to enclose the opening 58 in the ram in which the roller 54 is mounted.

The ball 52' is held in engagement with the hardened plate 53' of slot 50' by a spring-pressed plunger 60 which carries a roller 61 that rides on the bottom wall of the cylinder 36. This spring-pressed plunger 60 is mounted in an opening in the ram 12 and is secured in position by a plate 62 that is secured to the ram by screws 63.

Figure 3:
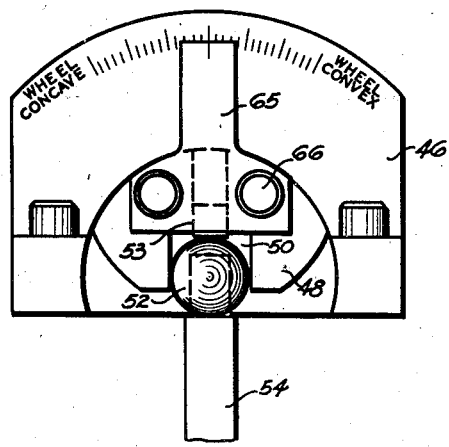
Fig. 3 is a fragmentary view looking at the front end of one of the control cams and its supporting block and showing the graduations provided to assist in adjusting the angularity of the cam.

Each of the cam members 48 and 48' is adjustable angularly in its holder 46 or 46'. The adjustment is effected by manual movement of the arms 65 and 65' (Figs. 1 and 3) which are identical with one another and which are secured to the holders 48 and 48', respectively, by screws 66. Each arm is provided with a zero mark to read against graduations inscribed on the face of the holder 46 or 46', as the case may be. The cam members 48 and 48' are secured in adjusted positions by clamping bolts 67 and 67', respectively. These clamping bolts pass through arcuate slots 68 and 68' formed in the holders 46 and 46', respectively, and they thread into the cam members 48 and 48', respectively. The heads of the clamping bolts engage the clamping discs 69 and 69', respectively, which seat in arcuate slots 70 and 70' formed on the peripheries of the holders 46 and 46' concentric with the axis about which the holders adjust.

The longitudinal movement of the ram 12 is controlled by a valve 75 of any suitable construction, which is shown in section in Fig. 1. This valve is connected in the usual manner with opposite ends of the cylinder 36, the duct which leads to one end of the cylinder being shown at 76 in Fig. 1. The stroke of the ram in the forward direction is limited by the bottoming of the piston 35 in the cylinder. The stroke of the ram rearwardly can be adjusted by adjusting the stop screw 77 which threads into a nut 78 that is secured in a bracket 79 which is fastened in any suitable manner to the spindle housing 10. The forward end of the screw 77 abuts against the rear end of the ram 12 at the limit of the rearward movement of the ram.

The position of the field of effective action of the dressing tools relative to the total stroke of the ram can be adjusted by adjusting the stop screw 80 which threads into the lug 81. This lug is fastened in any suitable manner to the ram 12 and it has a zero mark on it which reads against graduations inscribed on an arm 82 that is secured in any suitable manner to the rear end-plate 83 of the cylinder 36. The stop member 80 abuts against the hardened head of a pin 84 which is secured in the end-plate 83.

The balls 52 and 52' are free to move laterally in their pockets so that as a ball travels from one end to the other of the slot 50 or 50' of the cam member 48 or 48', the ball can move laterally in conformity with the longitudinal shape of the slot. The cam blocks 48 and 48' are, of course, always adjusted to identical angular positions, and the two cam members with their holders are provided simply to provide balanced support for the relatively long ram 12.

In the zero position of adjustment of the cam members 48 and 48', the plane surfaces of the hardened strips 53 and 53' are parallel to the axis of the wheel spindle 11 and extend in the direction of longitudinal reciprocation of the ram 12. Hence the balls 52 will roll in the cam slots 50 and 50', during the reciprocation of the ram, without imparting any transverse movement to the ram. When the cam members 48 and 48' are adjusted angularly, however, as, for instance, to a position such as shown in Fig. 2, the transverse positions of the balls will change as the balls roll through the cam slots. This is shown clearly in Figs. 6 and 7 where two positions of the ball 52 as it moves along the cam slot 50 are shown in dotted lines and in full lines, respectively.

As the ball moves from the full line position at one end of the slot to the dotted line position at the center of the slot, it not only moves laterally but vertically for it follows the inclined bottom wall of the slot under actuation of the spring-pressed plunger 55. This plunger operates through the ram 12 and the ram itself also rises, moving from the full line position to the dotted line position indicated diagrammatically in Fig. 6. This causes the diamonds carried by the ram to move vertically with reference to the surface of the grinding wheel.

As the ball continues through the slot 50 from the center to the other end of the slot, the ball will ride down again and force the ram 12 down again. Hence, as the ball rolls from one end of the slot to the other with the cam 48 in the position shown, a convex surface will be dressed on the grinding wheel. To dress a concave surface on the wheel, the cam member 48 must be adjusted to the other side of center position from that shown in Figs. 2 and 6. Then the ball will move vertically downward as it rolls from either end of the slot to the center thereof and so cause the diamond to dress a concave surface on the diamond wheel.

The principle of operation of the device is illustrated diagrammatically in Fig. 5 in connection with the dressing of a convex surface on a grinding wheel. The lines 85 and 85' denote the vertical paths followed by the balls 52 and 52' as they roll through the cam slots 50 and 50' and the line 86 denotes the path traced on the surface of the grinding wheel by the diamond 22 as the result of the movement of the ram 12. The paths 85, 85', and 86 are of identical curvature.

As already noted, one of the features of the invention is the incorporation in the dressing mechanism of the means for dressing not only an active profile on a grinding wheel but also a round on the wheel and the inactive portion of the wheel profile above the round. For this purpose, the three diamonds 21, 22, and 23 are provided, as already stated. The diamond 21 is a specially formed spherical diamond.

The diamond 21 is arranged so that its point projects a slight distance beyond the point of the diamond 22, but the two diamonds 21 and 22 are so positioned that the diamond 22 will engage the wheel first. Thus, if the wheel is rotating in the direction of the arrow 90 (Fig. 9), the diamond 22 will be arranged at the right of the vertical center line 91 passing through the wheel axis. Thus, the diamond 22 will remove sufficient stock from the wheel that the diamond 21 will not touch the periphery of the wheel at all while the diamond 22 is moving along the height of the wheel. As a result, the diamond 21 will dress the desired shape on the active profile of the wheel as governed by the movement of the ram 12 under actuation of the cams 50 and 51. At the end of the rearward stroke of the ram, however, the diamond 22 will cease its travel and then the diamond 21 will come into action. Through its spherical shape the diamond 21 will dress a round on the wheel as denoted at 93.

The diamond 23 is disposed behind the diamond 22 but does not project as far as the diamond 22. When the wheel is first dressed, the diamond 23 may engage the wheel and take a roughing cut off the wheel. It serves primarily, however, to dress the inactive portion 94 of the wheel profile which is always made of sufficient height to prevent breaking away of the wheel at the round. Fig. 10 shows the positions of the three diamonds at the end of the return stroke of the ram. The diamond 22 has completed the dressing of the profile shape on the active portion 92 of the periphery of the wheel; the diamond 23 has completed the dressing of the inactive peripheral portion 94 of the wheel and is now clear of the wheel; and the diamond 21 is in the process of dressing the round 93 on the wheel as the wheel continues to revolve on its axis.

It will be obvious that it is not necessary to employ three dressing tools in a dressing mechanism made according to this present invention, for the dressing apparatus may be used with a single diamond to dress the profile of the active portion of the wheel alone. Moreover, it will be obvious that while in the embodiment of the invention shown the balls are carried by the ram 12 and the cam members 48 and 48' are relatively stationary, the positions of these parts might be reversed, and that the cams might be mounted to travel with the ram while the balls are carried on the relatively stationary part of the wheel head. It will be further obvious that while the invention has been described in connection with the dressing of a grinding wheel for grinding cutter blades, the dressing mechanism of the present invention may be employed to dress any type of grinding wheel regardless of the purpose for which it is to be used, since it is capable of being employed wherever it is desired to dress a curved profile shape on a grinding wheel, or wherever it is desired to dress either a curved or a straight profile shape on a grinding wheel. It will further be understood that the invention is not limited to the use of cams having circular arcuate cam slots but that any desired shape of cam slot may be employed so as to produce any desired profile shape on the grinding wheel. It will further be understood that instead of using plane surfaced bottoms in the cam slots, the shapes of the bottoms may be modified to make possible further variation in the profile shapes dressed.

In general it may be said that while the invention has been described in connection with a particular embodiment thereof, it is capable of various further modifications, and the present application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a dressing mechanism, a support, a slide reciprocable on said support, a dressing tool carried by said slide, means for reciprocating the slide to pass the dressing tool along the surface to be dressed, and means for controlling the profile shape dressed on said surface comprising a cam member and a follower, one of which is secured to said slide and the other to said support, said cam member being so shaped as to effect lateral movement of the follower during the reciprocation of the slide, and means effective on said lateral movement for producing transverse movement of this slide.

2. In a dressing mechanism, a support, a slide reciprocable on said support, a dressing tool carried by said slide, means for reciprocating the slide to pass the dressing tool along the surface to be dressed, and means for controlling the profile shape dressed on said surface comprising a cam member and a follower, one of which is secured to said slide and the other to said support, said cam member having a longitudinally curved slot extending in the general direction of reciprocation of the slide and being mounted to be adjustable angularly about an axis extending in said direction, and means operable on the slide to cause the follower to follow the bottom of said slot and to cause corresponding movement of the slide.

3. In a dressing mechanism, a support, a slide reciprocable on said support and movable transversely of its reciprocable movement, a dressing tool carried by said slide, means for reciprocating the slide to pass the dressing tool along the surface to be dressed, and means for effecting transverse movement of the slide during its reciprocatory movement comprising a cam member and a ball follower, one of which is secured to the slide and the other to the support, said cam member having a circular arcuate slot extending in the general direction of reciprocation of the slide and being mounted for angular adjustment about an axis extending in said direction, and means operative on the slide to hold the follower against the bottom of said slot and to move the slide transversely with any transverse movement of the follower.

4. In a dressing mechanism, a support, a slide reciprocable on said support, a dressing tool carried by said slide, means for reciprocating the slide to pass the dressing tool along the surface to be dressed, and means engaging the slide at two spaced points above and below the slide, respectively, to cause the slide to move bodily in an arcuate path transversely of said surface as the slide reciprocates.

5. In a dressing mechanism, a support, a slide reciprocable on said support, a dressing tool carried by said slide, means for reciprocating the slide to pass the dressing tool along the surface to be dressed, and means for moving the slide transversely as it reciprocates comprising a pair of cams and a pair of followers engaging therewith, one of said pairs being secured to the slide and the other to the support, and one member of each pair being mounted above the slide and the other member of the pair being mounted below the slide, said cam members being formed to impart a bodily movement to the slide in an arcuate path transversely of said surface as the slide reciprocates.

6. In a dressing mechanism, a support, a slide reciprocable on said support, a pair of dressing tools mounted on the slide, one of which projects from the slide a less distance than the other but is disposed so as to engage the grinding wheel, which is to be dressed, first as the wheel rotates under the tools, the other tool being form shaped.

7. In a dressing mechanism, a support, a slide reciprocable on said support, a pair of dressing tools mounted on the slide alongside one another, one of which projects from the slide a less distance than the other but is disposed to engage the grinding wheel, which is to be dressed, first as the wheel rotates under the tools, the other tool being form shaped, and a third dressing tool mounted on the slide to project therefrom a distance less than the first tool, and being spaced from the first tool in the direction of movement of the slide.

8. In a dressing mechanism, a support, a slide reciprocable on said support, a dressing tool carried by the slide, means for reciprocating the slide to pass the dressing tool along the surface to be dressed, means for moving the slide transversely of said surface to dress a curved profile shape thereon comprising a cam and a follower, one of which is secured to the slide and the other to the support, said cam having a longitudinally curved slot which has a plane bottom and which extends in the general direction of reciprocation of the slide, and being adjustable angularly about an axis extending in said direction, and means for holding the follower in engagement with the bottom of said slot.

MAGNUS H. JOHANSON.